(12) United States Patent
Bennett (10) Patent No.: US 8,066,208 B2
(45) Date of Patent: Nov. 29, 2011

(54) CONVERTIBLE DISCHARGE SYSTEM FOR BALE SHREDDER

(75) Inventor: Patrick D. Bennett, Jamestown, ND (US)

(73) Assignee: Duratech Industries International Inc., Jamestown, ND (US)

( * ) Notice: Subject to any disclaimer, the term of this patent is extended or adjusted under 35 U.S.C. 154(b) by 0 days.

(21) Appl. No.: 12/720,873

(22) Filed: Mar. 10, 2010

(65) Prior Publication Data

US 2011/0220748 A1    Sep. 15, 2011

(51) Int. Cl.
*B02C 19/00*    (2006.01)
(52) U.S. Cl. ............ 241/30; 241/186.3; 241/186.35; 241/60; 241/186.5; 241/605
(58) Field of Classification Search ............ 241/605, 241/186.3, 186.35, 60, 186.5, 30, 18
See application file for complete search history.

(56) References Cited

U.S. PATENT DOCUMENTS

| | | | |
|---|---|---|---|
| 2,181,397 A | 11/1939 | Everett | |
| 3,032,219 A | 5/1962 | Martens | |
| 3,037,780 A | 6/1962 | Skromme et al. | |
| 3,112,752 A | 12/1963 | Morrison et al. | |
| 3,241,173 A | 3/1966 | Finn | |
| 3,295,299 A | 1/1967 | Brady et al. | |
| 3,391,812 A | 7/1968 | Heider | |
| 3,527,417 A | 9/1970 | Tompsett | |
| 3,771,733 A | 11/1973 | Hadley et al. | |
| 4,056,107 A * | 11/1977 | Todd et al. | 460/112 |
| 4,449,672 A | 5/1984 | Morlock et al. | |
| 5,090,630 A | 2/1992 | Kopecky et al. | |
| 6,155,506 A | 12/2000 | Loppoli | |
| 6,561,681 B1 | 5/2003 | Huang et al. | |
| 6,719,627 B2 | 4/2004 | Wolters et al. | |
| 6,863,605 B2 | 3/2005 | Gryspeerdt et al. | |
| 6,881,145 B2 | 4/2005 | Holmen | |
| 2002/0195509 A1* | 12/2002 | Lepage et al. | 241/186.3 |

OTHER PUBLICATIONS

2564 Balebuster Brochure, Published Dec. 31, 2008. 2 pgs.

* cited by examiner

*Primary Examiner* — Mark Rosenbaum
(74) *Attorney, Agent, or Firm* — Westman Champlin & Kelly PA (57) ABSTRACT

A bale shredder is mounted on a frame and has a flail that will shred material, such as hay, straw and silage, and an auger receives the shredded material and moves it toward a first end of the auger. The first end of the auger is surrounded by a chamber that has a first opening in an axial direction of the auger that opens into a fan or blower so that material going through the first opening is blown out of a discharge chute. An endless conveyor is mounted adjacent a second opening of the chamber, laterally of the auger, and is positioned to receive material from the second opening. Panels are provided for selectively blocking the first opening when the endless conveyor is to be moving material from the chamber, and for blocking the second opening when the fan is to be used for discharging material. The two different conveyors are selectively used for delivery of shredded material from the bale shredder.

17 Claims, 9 Drawing Sheets

CONVERTIBLE DISCHARGE SYSTEM FOR BALE SHREDDER

BACKGROUND OF THE DISCLOSURE

The present disclosure relates to a discharge system for a shredder having a rotor that shreds bales of hay, straw, silage and the like, and which selectively uses a discharge blower or fan to receive shredded material from a bale processor that disintegrates the baled material and discharges the material out a discharge chute, or uses a side discharge conveyor that discharges the shredded material in a windrow, such as in a feed bunk or along the ground.

In the prior art, bale shredders, such as those typically shown in U.S. Pat. Nos. 4,449,672 and 5,090,630, use a rotor with flails to disintegrate a bale of material and create a large air flow at the same time for discharging the material directly out to the side of the shredder.

Other bale shredders have used a fan that creates a large air flow that will blow the shredded material through a discharge chute a long distance from the machine, for example over 100 feet.

Various types of hay and silage wagons have used side discharge conveyors that will discharge material laterally of the wagon using a conveyor, so that a windrow is deposited off the outer end of the conveyor directly into a feed bunk, or onto the ground for feeding.

The bale processors with fans or blowers can discharge material onto the ground for feeding livestock, or can cover the ground with mulch when land is being reclaimed, such as when reseeding, redoing mines, roadwork and the like. Material also can be blown into feed bunks, windrows or stockpiles for later use as well, but the fan tends to spread the material and blow away smaller particles, and does not give the opportunity to closely control the size and placement of the windrow.

SUMMARY OF THE DISCLOSURE

The present disclosure relates to a convertible bale shredder unit that will permit discharging shredded material with a blower or fan through a discharge chute, or selectively discharge material from a conveyor that will move the material laterally of the bale shredder without an air flow carrying or blowing through the material. The bale shredder includes a flail for shredding the bales that will deposit shredded material passing through a large opening screen onto a conveyor. The conveyor conveys the material to a transfer or discharge chamber that has two openings, including an opening leading to an inlet of a blower or fan that is axially facing the conveyor (the plane of the opening is perpendicular to the direction of movement of the shredded material) and a side opening along the side of the discharge chamber that overlies a side conveyor so material fed through the side opening is carried by the conveyor. As shown the side conveyor is an endless chain and slat conveyor, although other types of conveyors can be used. The side conveyor is mounted so that the angle of incline of the side conveyor can be changed, preferably using a hydraulic actuator, and the side conveyor is independently driven and controllable by an operator.

The side conveyor can be left in place on the bale shredder when the fan is to be used, and the side discharge opening leading to the side conveyor can be blocked with a perforated panel that forms air inlets, and the opening leading to the fan inlet is unblocked or left open. When the side conveyor is to be used for discharging shredded material, the opening leading to the fan inlet is blocked with a wall panel, so that the shredded material such as straw, hay, or silage, must move through the side opening, where it is then conveyed laterally.

Either the side conveyor or the fan can be operated as the bale shredder is moved along the ground, so that windrows of material can be formed. In the case of using the fan the material can be blown with a good volume of air to provide a layer of bedding or a covering layer on the ground for other purposes. The conversion from a fan discharge to a side conveyor discharge is very simple, utilizing suitable fasteners for removing and replacing the desired blocking panel, and selectively driving either the side conveyor or the fan.

DETAILED DESCRIPTION OF ILLUSTRATIVE EMBODIMENTS

A bale shredder indicated generally at 10 includes a frame member 12 that has rear wheels 14 and a suitable towing arrangement including a forwardly extending tongue 16 that is designed to be attached to a tractor or other prime mover represented schematically at 17. The prime mover 17 includes a power take off and a hydraulic system including a pump, reservoir and valve system. A power takeoff shaft 15 is driven by the prime mover used for powering the bale shredder from the power take off of the tractor or other prime mover 17, as is well known in the art. The tractor or prime mover also provides hydraulic power for components as desired.

Figure 2:
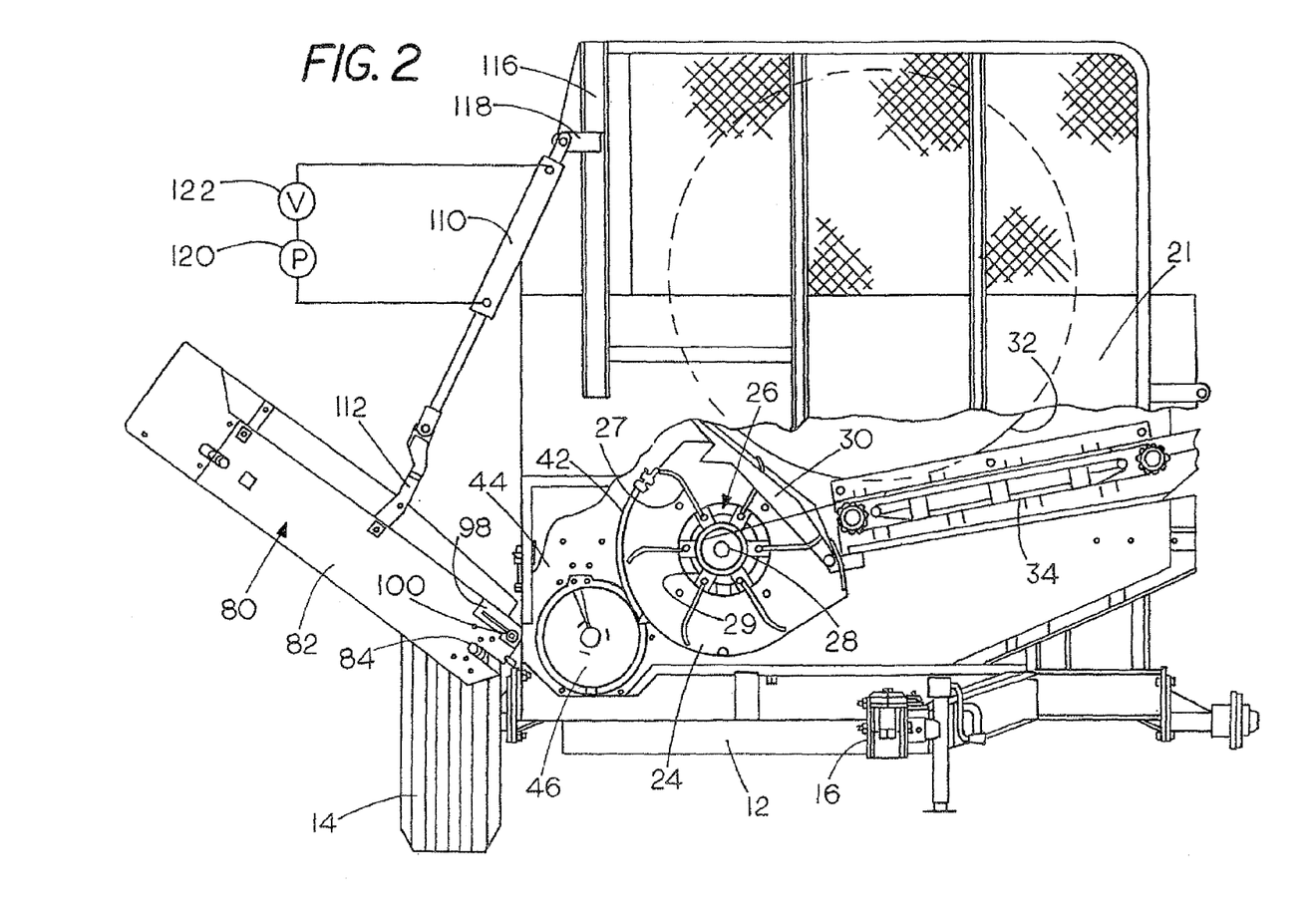
FIG. 2 is a front elevational view of a bale shredder made according to the present disclosure showing a side discharge conveyor in place, and with a forward wall broken away to show a bale shredding mechanism.
Figure 3:
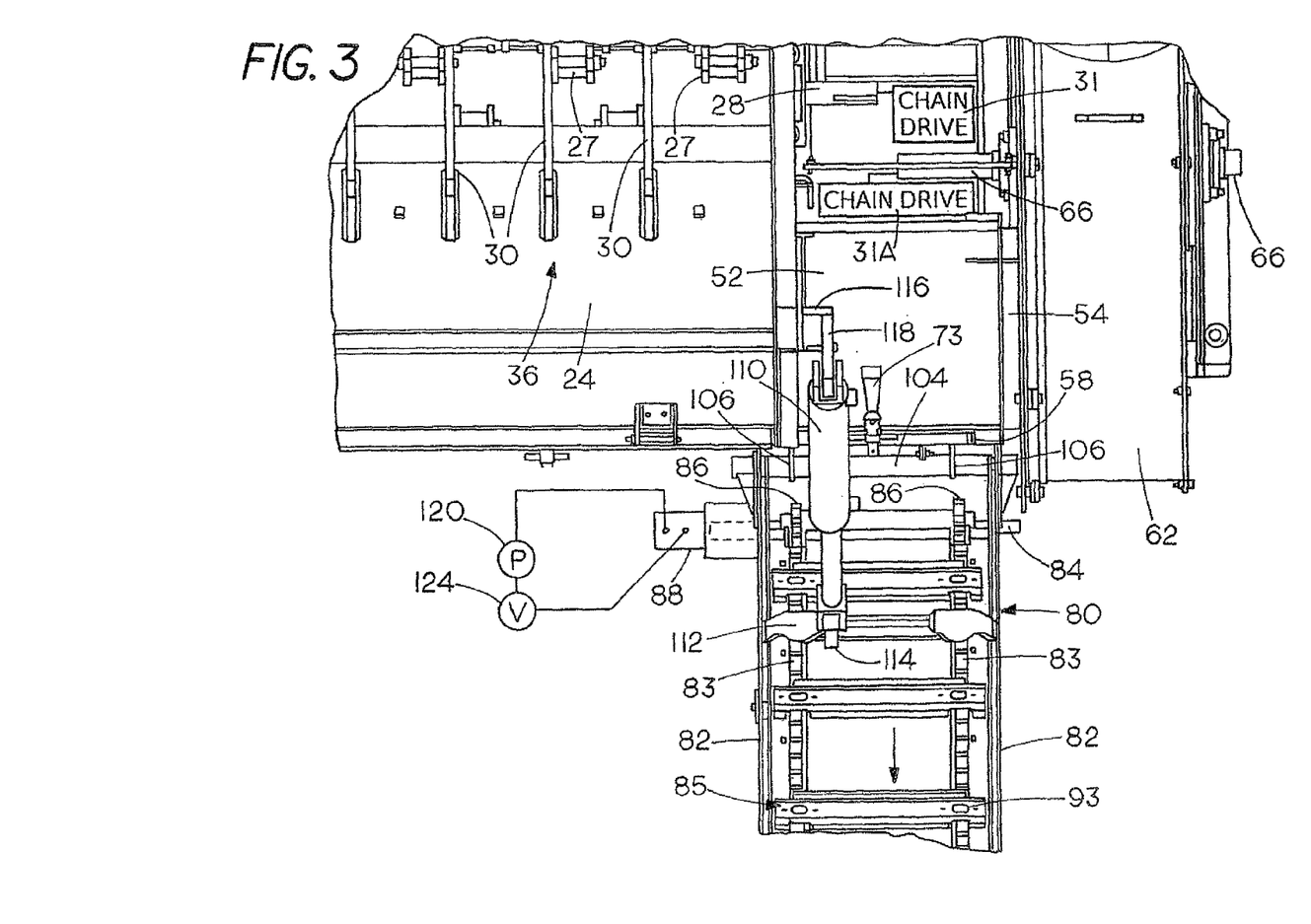
FIG. 3 is a fragmentary top plan view of a portion of the bale shredder of FIG. 2 showing the position of a side discharge conveyor.

A main bale shredding housing 20 is supported on the frame 12 and has a forward end wall or plate 21 and a rear end wall or plate 22 A part cylindrical flail housing 24 extends between the front and rear walls, as shown in FIGS. 2 and 3. The front wall may be a partial mesh or screen. A shredding flail assembly 26 is provided with a longitudinally extending central shaft 28 that is mounted with suitable bearings on the front and rear walls 21 and 22 and supports a rotor 29. A plurality of flails 27 are pivoted on the central rotor 29. The shaft 28 is rotated and driven in a suitable manner, for example with a chain drive indicated schematically at 31 in FIG. 3. The chain drive is coupled to the power take off shaft through a suitable gear box, if desired. The flail assembly 26 can be driven using other power transmission arrangements from the power takeoff shaft 15.

There are a series of spaced apart bale support bars 30 that are formed to support a bale of material to be shredded, such as hay or straw, shown schematically at 32 that is carried on a feed conveyor 34. Feed conveyor 34 is also suitably powered and is moved so that the top flight of the conveyor 34 moves toward the flail assembly 26 to move the hay bale 32 toward the flails and also to tend to rotate the bale. The support bars 30 are spaced apart to form slots so the flails 27 pass through the slots and the bars form a support for the bale 32 in a bale chamber 36 that is formed between the end walls 21 and 22. Conveyor 34 has side chains, with slats between the chains as shown in U.S. Pat. No. 5,090,630 and U.S. Pat. No. 4,449,672, both of which are incorporated by reference.

Figure 1:
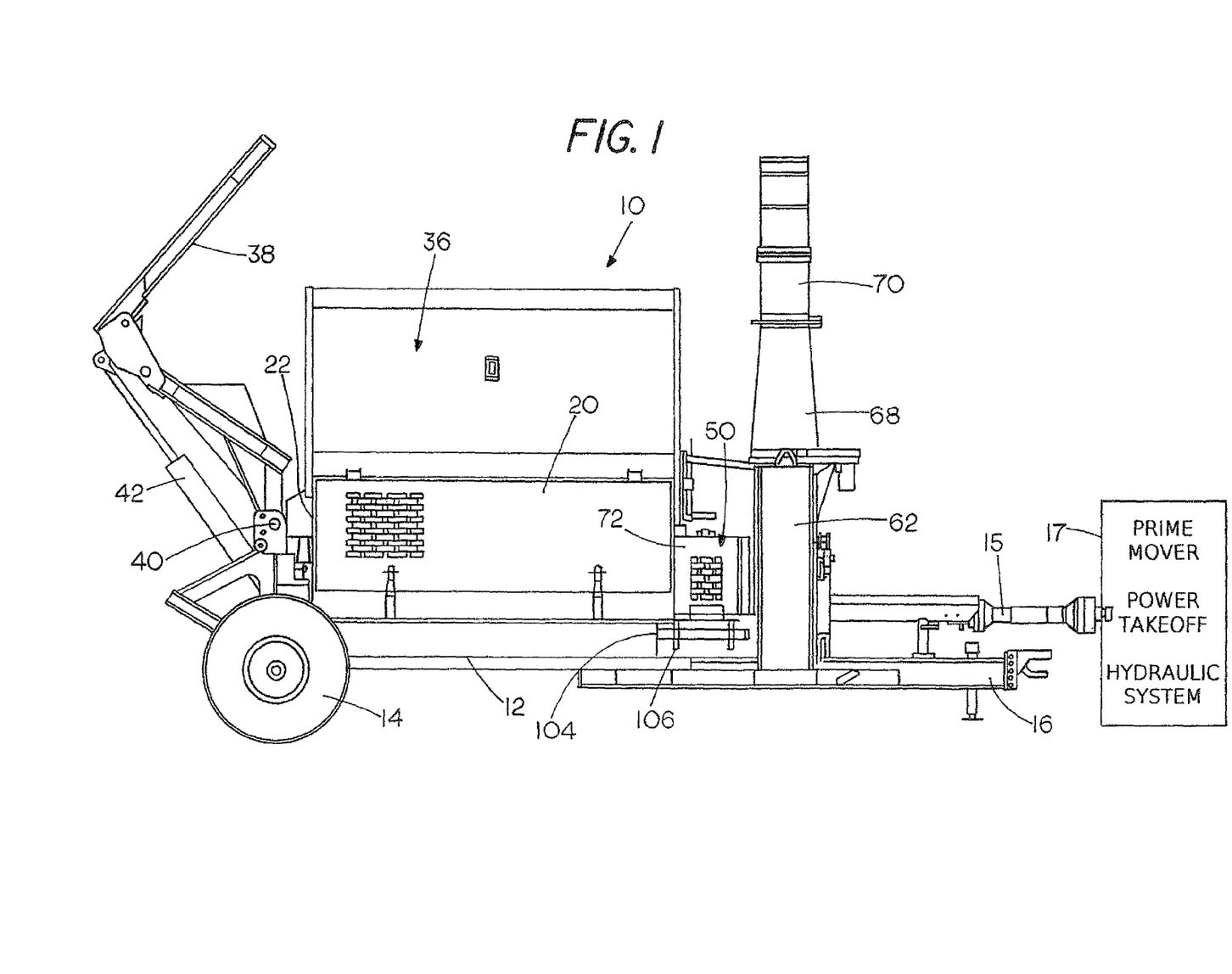
FIG. 1 is a side elevational view of a bale shredder showing a discharge fan in place, and showing a mounting bracket for a side discharge conveyor.

Bales 32 can be loaded into the bale chamber 36 through the use of a pivoting lift fork 38 (FIG. 1) that is pivotally mounted to the frame 12 on suitable supports and moved about a pivot axis 40. The fork is pivoted from a lowered position near the ground to pick up a bale, to a position where it will drop a bale held on the fork into the bale chamber using a hydraulic actuator 42. This bale lift fork arrangement is also shown and operates in substantially the same manner as that illustrated in U.S. Pat. No. 5,090,630.

Figure 5:
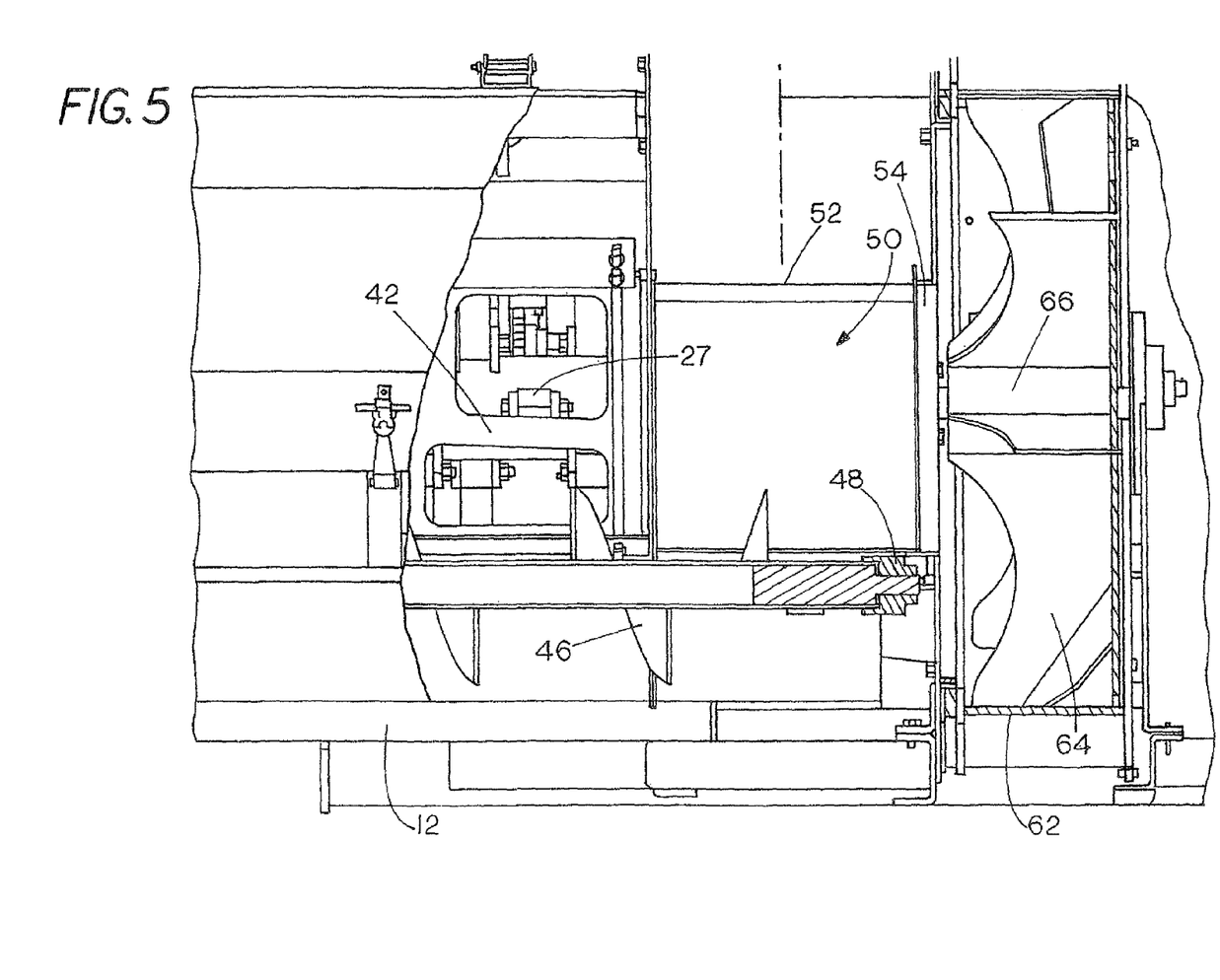
FIG. 5 is a side view similar to FIG. 4 with parts broken away to show the mounting of a conveyor used for moving material longitudinally to a discharge or transfer chamber and a discharge fan impeller.
Figure 6:
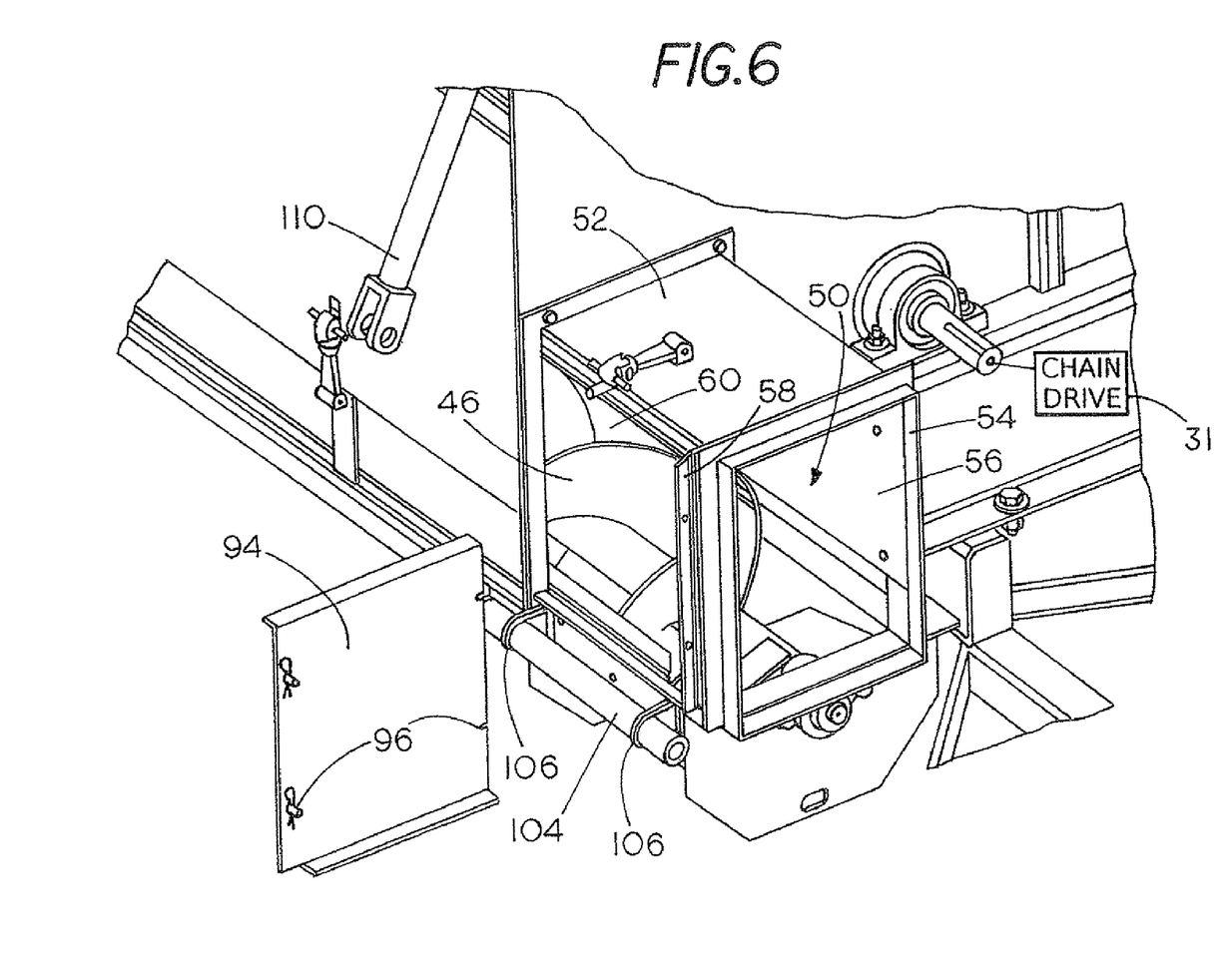
FIG. 6 is a front perspective view of a portion of a bale shredder showing two discharge openings leading from a discharge chamber, with a blocking panel positioned to be installed.

A bale 32 can be loaded into the bale chamber 36 so the bale rests on the feed conveyor 34 and the support bars 30 and then when the flail rotor is powered, the flails 27 will engage and shred the bale. The conveyor 34 tends to move the lower side of the bale toward the flails. The wall 24 can include a wall section 42 forming a coarse screen that has perforations of suitable size so that material shredded by the flails will pass through the screen and into a longitudinal conveyor. As shown, the material drops into an auger housing or chamber 44 in which a helical auger 46 is mounted. The auger 46 extends in longitudinal direction of the frame, and is driven in a suitable manner, such as with a chain and sprocket drive or a hydraulic motor. The auger is rotated in a direction to move material that passes through the wall section 42 toward the front end of the bale shredder, or other desired location. FIGS. 5 and 6 illustrate the auger 46 having a central shaft mounted on suitable bearings such as that shown at 48, and screen section 42 is also shown in FIG. 5 with large openings through which shredded material will pass.

The forward end of the longitudinal conveyor, as shown the auger 46, is terminated in a shredded material discharge or transfer chamber 50 (FIG. 6) from which shredded material is discharged. The material discharge chamber 50 is at a forward end of the frame, but can be at other desired locations depending on the positioning of the conveyor 46, and is defined by a top wall 52, an inner side wall 53 and a forward wall with a frame 54 that surrounds a forward or first opening 56. The material discharge chamber is in line with the direction of movement of material by the conveyor 46. An outer side wall of the chamber 50 has a second or side facing frame 58 that surrounds a side discharge opening shown at 60 leading from the material discharge chamber 50. A fan housing 62 shown in FIG. 1 and FIG. 3 has an impeller or radial fan rotor 64. Rotor 64 may be driven with a separate chain drive 31A connected between the power take off shaft 15 and the rotor central shaft 66. The fan housing has an upper discharge spout 68, with a chute 70 that can be rotated about an upright axis so that the discharge opening of the chute can be aimed in different directions as desired. This is a conventional fan for discharging material and is known in prior art bale shredders. The fan is, in effect a conveyor for moving material from the material discharge chamber to a desired location, but using air for conveying.

When the fan is to be used, the second side opening has a perforated (or slotted) air inlet (and material diverting) panel or plate 72 installed on the frame 58, so that the opening 60 is sufficiently covered to divert or prevent shredded material from be discharged out the side opening 60, but which is open enough to permit air flow inwardly into the material discharge chamber 50 and out through the first or forward opening 56 into the impeller of the fan. Opening 56 forms an inlet opening to the fan. The shredded material is then blown out through the discharge chute with a large volume of air carrying it along the chute 70 to a discharge location.

Figure 7:
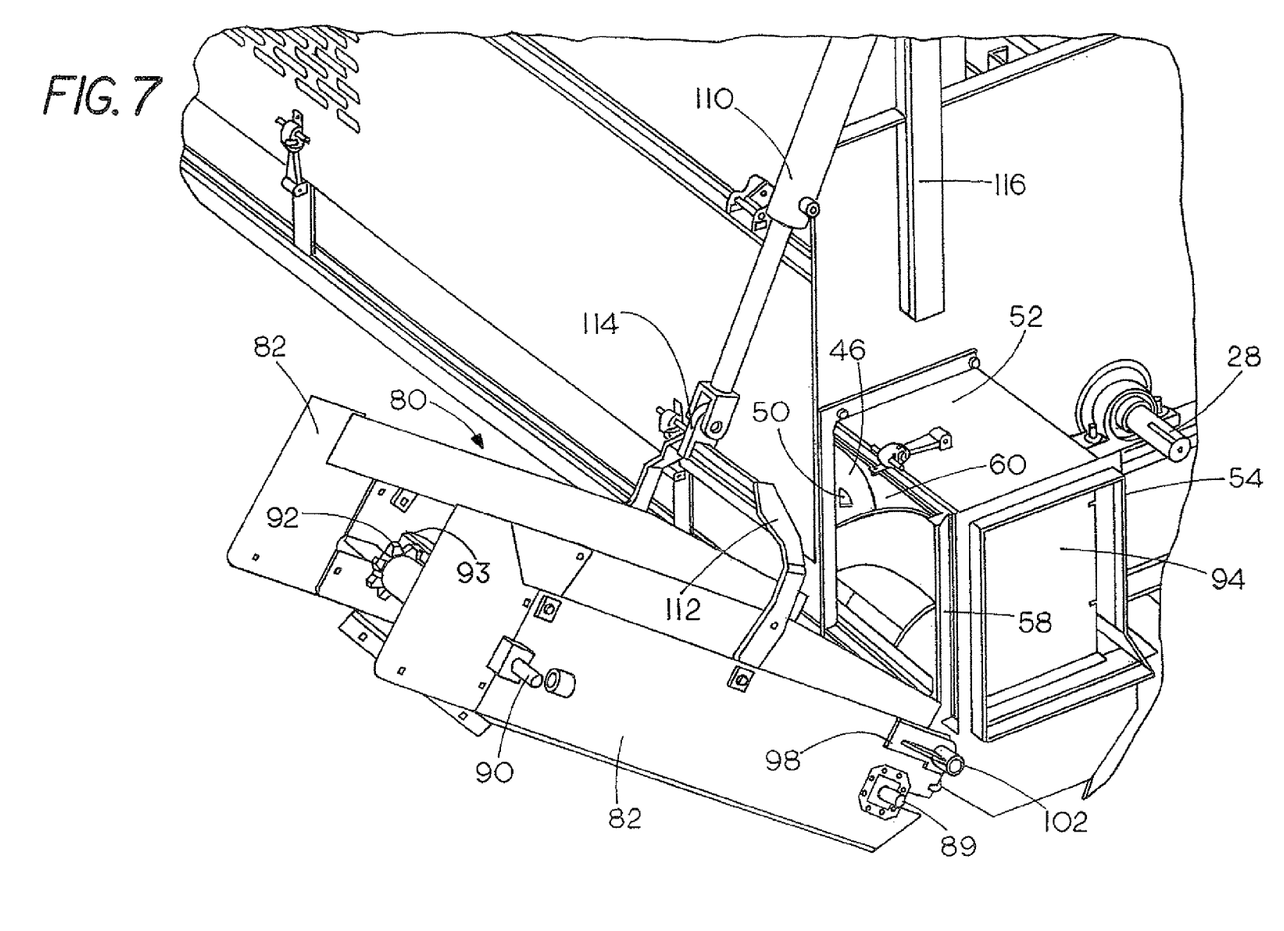
FIG. 7 is a perspective view similar to FIG. 5 with the fan removed and side conveyor shown in position.

In the present disclosure, an improvement comprises providing a convertible function, utilizing a side conveyor 80. The side conveyor 80 is an endless chain and slat conveyor member 85, of conventional design, having side walls 82 that are spaced apart and held together with suitable cross members. A drive shaft 84 is mounted between the side walls 82 at one end of the conveyor adjacent the bale shredder and the drive shaft 84 has sprockets 86 mounted thereon. The side chains 83 of chain and slat endless conveyor member 85 are mounted on the sprockets. The drive shaft 84 is driven by hydraulic motor and gear drive assembly 88 in a normal manner. As shown in FIG. 7, the side walls 82 of the conveyor 80 mount an outer end shaft 90 which also has sprockets such as that shown in 92 that receive the chains 83, so that the slats 93 mounted on chains 83 are moved when the side conveyor is powered. The top length or reach of the chain and slat conveyor member 85 carries material on the conveyor laterally outwardly from the bale shredder. A belt conveyor or other types of conveyors also can be used as a side conveyor.

Figure 4:
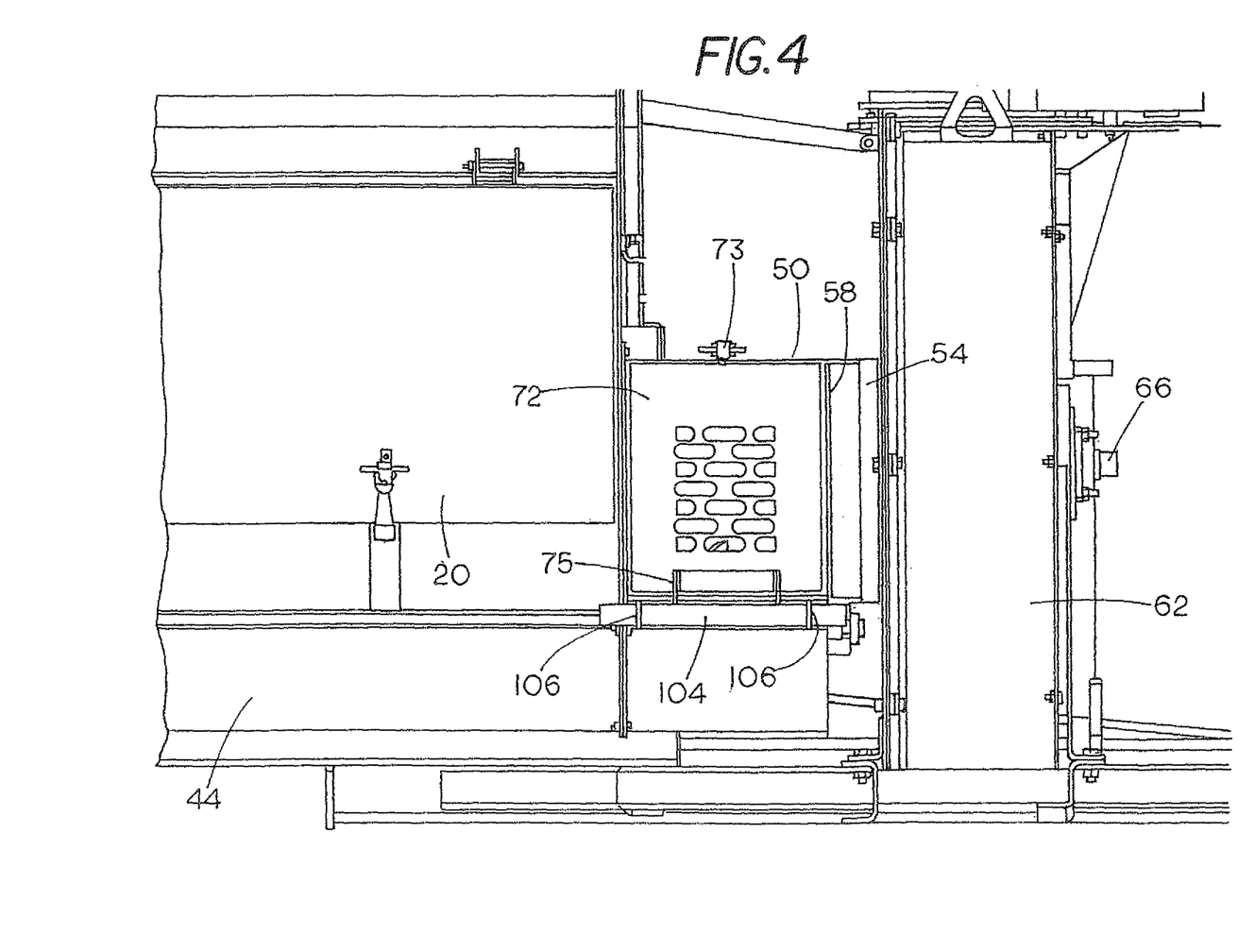
FIG. 4 is an enlarged side view of the bale shredder showing a mounting bracket for a side discharge conveyor and a blocking or material diverting panel associated with a side discharge opening.
Figure 8:
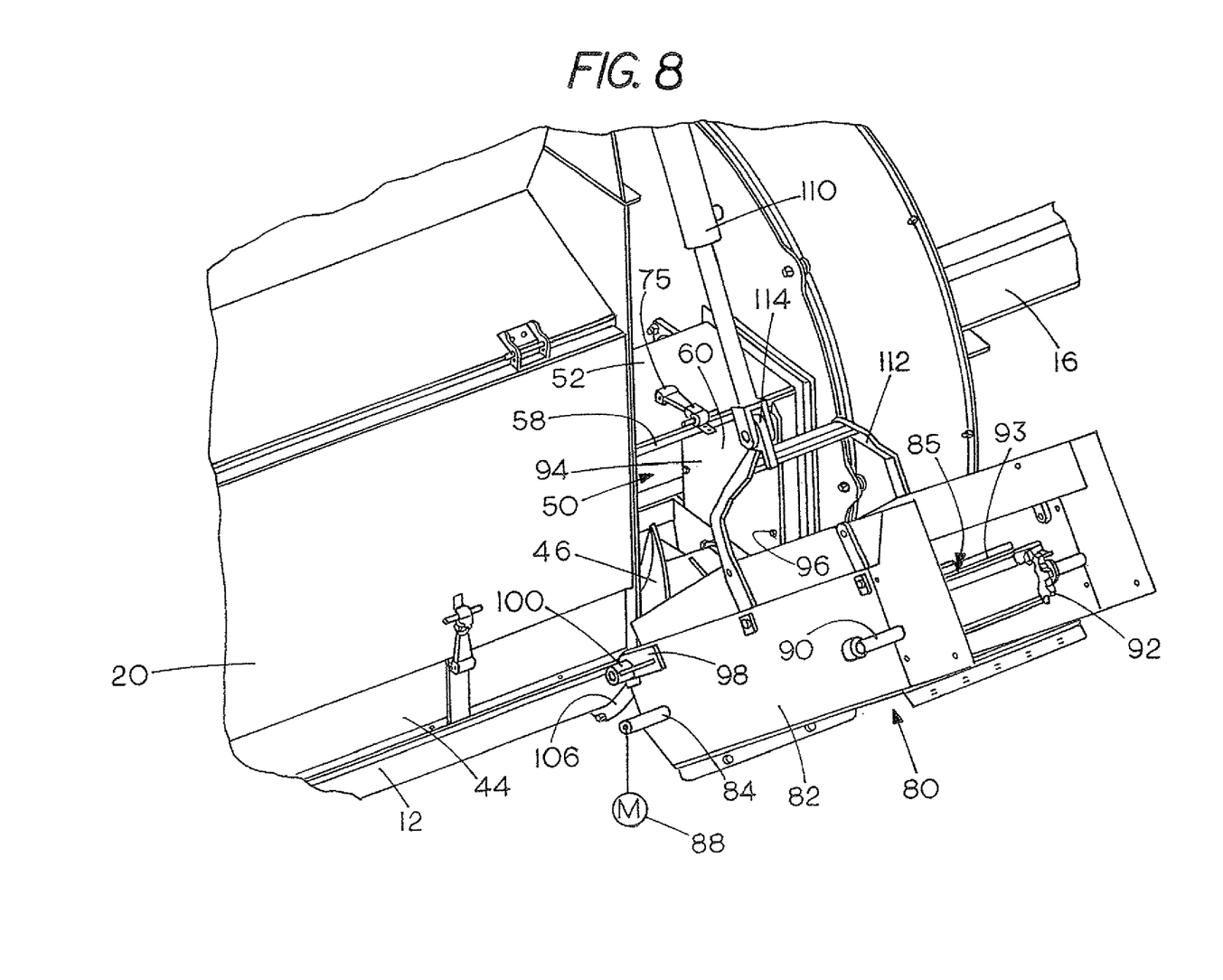
FIG. 8 is a perspective view looking forwardly and showing the side conveyor and side discharge opening and showing a panel blocking the opening leading to the fan.

When the side conveyor 80 is to be used, the second side opening 60 is unblocked by removing the perforated or slotted panel or plate 72. This panel 72 can have quick release fasteners including a quick release latch 73, and can be held in place at the bottom of the opening with suitable retainer members shown at 75 (FIG. 4), which merely hook over the lower portion of the frame 58 and then the panel 72 is latched in place with the latch 73. After panel 72 is removed, and the opening 60 is open as shown in FIG. 7, a blocking or material diverting panel or plate 94 is put into place to divert material and prevent material from passing through the opening 56. As shown the panel 94 covers the opening 56 leading to the fan. The fan housing is removed completely in FIG. 7 to show the blocking or material diverting plate. The blocking panel 94 can be held in place in frame 54 with suitable fasteners 96 as well, that can be accessed from the opening 60, as shown in FIG. 8. These fasteners 96 can be any type of quick release fasteners desired, so it is easy to put the blocking or diverting panel 94 into position to divert material from the opening 56 when the plate 72 has been removed from side opening 60.

The side walls 82 of the side conveyor 80 have mounting hubs 98 attached thereto at the inner end as shown in FIGS. 7 and 8 in particular, and these mounting hubs include sleeves 100 that will receive a shaft 102 that fits into and passes through a mounting sleeve or tube 104 that is mounted on suitable brackets 106 to the frame 12. The shaft 102 will slide through the hubs or sleeves 100, and through the mounting tube 104 to retain the conveyor 80 in position relative to the frame 12. The conveyor 80 will pivot about the shaft 102.

The angle of the conveyor 80 relative to horizontal about the axis of the shaft 102 is controlled with a hydraulic actuator 110 that is connected to a yoke 112 fastened to the side walls 82 of the conveyor 80. The actuator 110 has its rod end connected to an ear 114 on the yoke 112, and the base end of the actuator is attached to an upright frame member 116 and an ear 118 as shown in FIGS. 2 and 3.

The hydraulic source for operating the actuator, as well as the hydraulic motor 88 is generally on the prime mover or tractor that is pulling the bale shredder, and includes a pump 120, and a valve 122 for the actuator 110 (FIG. 2), and a valve 124 for the hydraulic motor 88 (FIG. 3) which permits shutting off or turning on the side conveyor. Again, this is conventional hydraulic power delivered to the hydraulically driven components.

In FIG. 6, the blocking or diverting panel or plate 94 is shown in a position where it is about to be installed through the opening 60 to cover the opening 56. The panel 94 is merely inserted through the opening 60, placed on the back side of the front frame 54 and held in place with suitable fasteners.

The bale shredders that utilize blowers such as that shown in 62 for distributing the shredded material carry a high volume of air with the shredded material, and when cattle are being fed high quality hay, such as alfalfa, the leaves and other fine components of the plants that contain substantial nutrients can be separated from the coarser materials, and lost, which reduces the nutrients in the feed. Use of the side conveyor 80 avoids that problem in that there is not a high volume of air carrying the material so fines are not lost, and all the shredded material that is fed to the side conveyor by the longitudinal conveyor in the shredder through the transfer or discharge chamber 50 is distributed into a windrow or into a feed bunk as desired.

Figure 9:
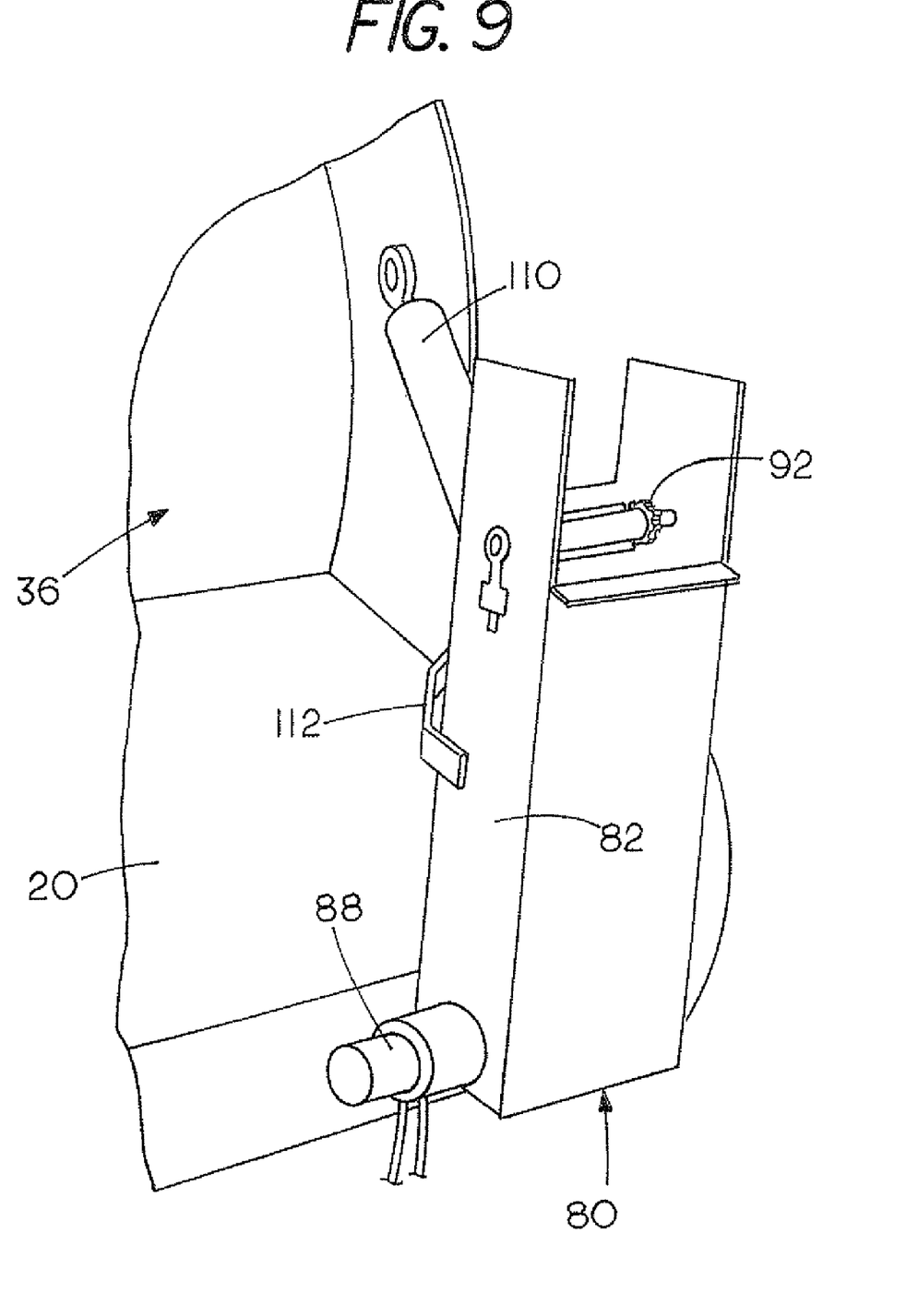
FIG. 9 is a rear perspective view showing the side discharge conveyor in a retracted position.

The fan 62 can be utilized for spreading shredded straw for bedding or for protection of seed beds. The conversion of the shredder from using a blower to using the lateral feed conveyor is easily done, as outlined, by replacing or removing material diverting plates or panels. When the fan is not being used and the panel 94 is in position blocking the opening 56 material cannot enter the fan inlet. The fan is not operable to convey or blow shredded material, but can be left running since the power consumed as the impeller spins in the fan housing is minimal. The side conveyor is driven by operating the hydraulic motor 88 using the valve 124. When the side conveyor is not being used it can be shut off, the side panel 72 put over opening 60 and the panel 94 removed from the opening 56 so the fan is operable. When the side conveyor is not being used, it can be folded upwardly to a position so that it does not substantially increase the width of the shredding machine, as shown if FIG. 9.

Although the present invention has been described with reference to preferred embodiments, workers skilled in the art will recognize that changes may be made in form and detail without departing from the spirit and scope of the invention.

What is claimed is:

1. A bale shredder comprising a frame, a shredding rotor and a bale chamber on the frame for holding bales for shredding, a first conveyor receiving materials shredded by the rotor and conveying the material to a first end of the frame, a discharge chamber receiving material from the first conveyor, a first opening defined in the discharge chamber positioned substantially in line with a direction of movement of material by the first conveyor, a second opening in the discharge chamber facing laterally of the direction of movement of material by the first conveyor, a fan mounted on the frame and having an inlet aligning with the first opening, and a second conveyor supported on the frame and positioned to receive material discharged from the second opening and to convey material laterally outwardly from the frame.

2. The bale shredder of claim 1, including a first panel that is substantially imperforate for selectively mating with the first opening to inhibit material from passing from the first conveyor into the inlet of the fan.

3. The bale shredder of claim 2, and a second panel having openings permitting air flow therethrough, second panel being adapted to mate with the second opening to inhibit material from passing through the second opening, the first opening being uncovered when the second panel is mated with the second opening.

4. The bale shredder of claim 1, wherein said second conveyor comprises an endless conveyor member having a top section that moves in a direction away from the frame when the second conveyor is driven.

5. The bale shredder of claim 4, and a hydraulic motor for driving the second conveyor to move the endless conveyor member in a closed path.

6. The bale shredder of claim 1 further characterized by the first conveyor comprising an auger conveyor.

7. A bale shredder comprising a frame supportable on a ground surface, a bale support chamber mounted on the frame for receiving bales of shreddable material, a rotor for shredding material from the bale, a first conveyor in position to receive material that is shredded by the rotor and convey the material to a selected location on the frame, a material chamber adjacent the selected location on the frame to receive material from the first conveyor, the material chamber having a first opening spaced from the first conveyor in direction of movement of material carried by the first conveyor, the material chamber having a second opening facing laterally of the direction of movement of material carried by the first conveyor, a second conveyor member for receiving material from the first conveyor through the first opening and operable to transfer the material received, a third conveyor member positioned on the frame adjacent the second opening to receive material from the first conveyor passing through the second opening and operable to transfer the material received laterally of the frame, and a panel adapted to selectively divert material from passing through the first opening.

8. The bale shredder of claim 7, wherein said second conveyor member comprises a blower having an impeller to project material received through a discharge chute.

9. The bale shredder of claim 7 wherein the first conveyor comprises an auger conveyor.

10. The bale shredder of claim 8, further comprising a second panel adapted to selectively divert material from passing through the second opening; and having openings therein for permitting air to flow through the second panel, the second panel being positioned to divert material from passing through the second lateral opening when the first opening is substantially unobstructed.

11. The bale shredder of claim 7 wherein said third conveyor member has an endless conveyor member mounted on spaced shafts that are spaced laterally from the frame, and a motor to drive one of the shafts to move the endless conveyor member so that a top portion of the endless conveyor member carries material passing through the second opening laterally of the frame.

12. The bale shredder of claim 11 wherein said endless conveyor member is a chain and slat conveyor, with the chains being mounted over the spaced apart shafts.

13. The bale shredder of claim 11 wherein said third conveyor member includes spaced apart side walls between which the endless conveyor moves, a cross member on said side walls, said side walls being mounted for pivotal movement relative to the frame, and an actuator supported on the frame and having an end coupled to said cross member on the third conveyor member for controlling the pivotal movement of the third conveyor member about its mounting.

14. The bale shredder of claim 7 and a second panel adapted to selectively divert material from passing through the second opening.

15. A method of providing two different discharge devices on a bale shredder having a shredding flail and a first conveyor for moving the material that is shredded toward a discharge location of the bale shredder, the method comprising:

providing a chamber for receiving material from the first conveyor at the discharge location of the bale shredder, providing a first outlet from the chamber to a second conveyor member, providing a second outlet from the chamber, providing a third conveyor adjacent the second outlet, the first and second outlets facing in different directions from each other, and selectively blocking at least portions of the first and second outlets such that material in the chamber will selectively be moved through one of the first and second outlets to the respective conveyor adjacent that outlet.

16. The method of claim 15 wherein the second conveyor comprises a blower, and the third conveyor comprises an endless conveyor having an upper side moving material deposited on the third conveyor laterally of the bale shredder.

17. The method of claim 15 including independently driving the second and third conveyors.

* * * * *